Patented Feb. 17, 1948

2,436,062

UNITED STATES PATENT OFFICE 2,436,062

SULFONAMIDE DERIVATIVES

Philip S. Winnek, Riverside, Conn., assignor to American Cyanamid Company, New York, N. Y., a corporation of Maine No Drawing. Application October 17, 1941, Serial No. 415,430

5 Claims. (Cl. 260—397.7)

This invention relates to a new class of chemical compounds and methods for their preparation. More particularly it relates to sulfonamide derivatives of nitro guanidines and amino guanidines.

This new class of chemical compounds may be represented by the following general formula:

in which X represents amino or a substituted amino radical, such as alkylamino, arylamino, aralkylamino, and the like, or a radical convertible into an amino group including radicals such as nitro, acylamino, halogen, and azo radicals, G represents an amino guanidine or a nitro guanidine radical and the acid addition salts of such compounds.

The structural formula for the sulfanilyl amino or nitro guanidines is probably as follows:

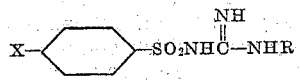

in which X represents one of the radicals indicated in the general formula and R is an amino or nitro group.

Some of the compounds of this invention are bacteriostatic and hence may be used as chemotherapeutic agents. They may also be used as intermediates for the preparation of other compounds, such as pharmaceuticals and particularly azo dyestuffs.

The compounds of the present invention may be prepared by reacting a p-substituted benzene sulfonyl halide with nitroguanidine, in which the p-substituent is a radical convertible into an amino group, including those such as nitro, acylamino, halogen, and azo radicals. These reaction products may then be converted into the compounds of the general formula in which X is an amino group by hydrolysis of the acylamino group, by reduction of the nitro and azo groups, or by reaction of the halogen group with ammonia. Preferably the reaction between the nitro guanidine and the sulfonyl halide is one in which a reaction medium employing an organic liquid, such as acetone, isopropyl alcohol, tertiary butyl alcohol, dioxane, or the like, is used. In this reaction a hydrogen halide is liberated and in some instances it may be desirable to provide a basic reaction medium which will unite with the hydrogen halide evolved. This may be effected by carrying out the reaction in a suitable medium and adding an excess of sodium hydroxide or other alkali hydroxide or in some instances the reaction may be carried out in the presence of a basic reaction medium, such as pyridine, in which case it is not necessary to add the sodium hydroxide.

In the reaction between the p-substituted benzene sulfonyl halide and nitro guanidines the nitro guanidine derivatives are obtained and the nitro group on the guanidine portion of the molecule may be readily reduced by ordinary methods to the corresponding amino guanidine derivative. For many purposes the nitro guanidine derivatives and the amino guanidine derivatives may be used interchangeably since this particular group represents a very small proportion of the compound as a whole.

The invention will be described in greater detail in conjunction with the following specific examples, which however, are merely illustrative of the preferred methods of preparing representative compounds of the class and are not intended to limit the scope of the invention. The parts are by weight except in the case of liquids which are expressed in corresponding parts by volume.

EXAMPLE 1

*Acetylsulfanilylnitroguanidine*

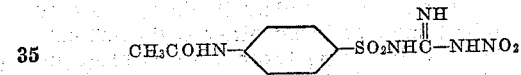

To a solution of 40 parts of sodium hydroxide in 100 parts of water are added 100 parts of acetone and 52 parts of nitro guanidine. Then a solution of 125 parts of acetylsulfanilylchloride in 500 parts of acetone is slowly added with mechanical stirring and cooling so that the temperature does not rise above 13° C. During the addition 300 parts of water are added to prevent the formation of a solid cake. The final mixture is stirred for half an hour and then made acid with hydrochloric acid. Any solid which does not dissolve is filtered off, dissolved in acetone and recombined with the filtrate. On removal of the acetone by distillation, a precipitate of acetyl sulfanilylnitroguanidine forms. The product is purified by dissolving in dilute ammonium hydroxide and reprecipitating with hydrochloric acid.

In place of acetone, isopropyl alcohol, tertiary butyl alcohol, or dioxane may be used as the reaction medium.

EXAMPLE 2

*Acetylsulfanilylaminoguanidine*

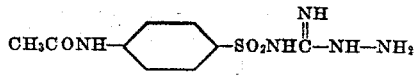

Sixty-nine parts of acetylsulfanilylnitroguanidine are added to a hot slurry of 100 parts of iron powder and 270 parts of 5% acetic acid. The reaction mixture is evaporated to dryness on a steam bath. The residue is extracted with 500 parts of boiling acetone in several portions. By evaporating the extracts, crude acetylsulfanilylaminoguanidine is obtained. This is purified by crystallization from water.

EXAMPLE 3

*Sulfanilylaminoguanidine*

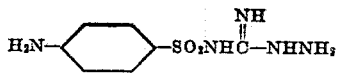

Eighteen parts of acetylsulfanilylaminoguanidine are refluxed with 37 parts of concentrated hydrochloric acid and 74 parts of water for five minutes after all of the solid has dissolved. On cooling and neutralization with 40% sodium hydroxide solution the crude sulfanilylaminoguanidine precipitates. It is purified by crystallization from water, washing with boiling acetone and recrystallization from aqueous alcohol.

EXAMPLE 4

*Sulfanilylnitroguanidine*

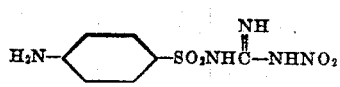

Ten parts of acetylsulfanilylnitroguanidine are refluxed with 21 parts of concentrated hydrochloric acid and 42 parts of water until all the solid has dissolved. The solution is filtered hot and rapidly cooled. Ammonium hydroxide is added to maximum precipitation. The crude sulfanilylnitroguanidine is filtered off and purified by crystallization from absolute alcohol using activated charcoal to remove impurities.

In the above examples the p-acetylaminobenzenesulfonyl chloride was used in carrying out the reaction. The acetyl compound is preferred because of its cheapness and availability. However, it is to be understood that other acyl compounds may be used including those such as propionyl, butyryl, benzoyl, nicotinyl, and the like. Similarly, instead of p-acetylaminobenzenesulfonylchloride the corresponding p-acetylaminobenzenesulfonylbromide may be used.

In Example 1 p-nitrobenzenesulfonylchloride may be used instead of the p-acetylamino compound, in which instances the corresponding p-nitrobenzenesulfonyl nitro guanidines are obtained. The p-nitro compounds thus obtained may be reduced to the p-amino compounds by any one of several reduction methods well known in the art.

The sulfanilylamino or nitroguanidines will react readily with any inorganic or organic acid to form addition salts therewith. The ordinary inorganic acid addition salts, such as the hydrochlorides, sulfates, phosphates, chlorates, and the like, may be prepared by adding the sulfanilylamino or nitroguanidine to a relatively strong aqueous solution of the acid. The salts produced by such reactions may be very conveniently recovered by diluting the aqueous solution with an organic solvent such as acetone and collecting the resulting precipitate by filtration. The acid addition salts of the water soluble organic acids, for example, acetic, lactic, mandelic, and the like, may be prepared as described in the processes above and in other cases the acid addition salts may be prepared by a method in which a relatively water insoluble organic acid, such as benzoic, is dissolved in an organic solvent, for example ethyl alcohol, and the sulfanilylamino or nitro guanidine added to this solution. The salt may then be recovered from the solution by any convenient means, as for example by evaporating the solution to dryness. It is readily seen, therefore, that the present invention relates to and includes any inorganic acid salt or any organic acid salt of the various sulfanilylamino or nitro guanidines. The organic acid salts may be those produced from saturated or unsaturated carboxylic acids, saturated or unsaturated hydroxy carboxylic acids, as well as halogenated or other substituted or unsubstituted acids of the aliphatic, alicyclic, aromatic, or heterocyclic series. Preferably the salts are those produced from relatively non-toxic organic acids or those having some bactericidal or other therapeutic property including acids such as acetic, salicyclic, mandelic, lactic, nicotinyl, p-aminobenzoic, and the like.

The above description and examples are intended to be illustrative only. Any modification or variation therefrom which conforms to the spirit of the invention is intended to be included within the scope of the claims.

I claim:

1. The process which comprises reacting nitro guanidine with a p-acetylaminobenzenesulfonyl halide and reducing the nitro group on the guanidine portion of the reaction product to an amino group to produce p-acetylsulfanilylaminoguanidine, and removing the acetyl group by hydrolysis to produce sulfanilylaminoguanidine.

2. The process which comprises reacting nitro guanidine with p-acetylaminobenzenesulfonylchloride and reducing the nitro group on the guanidine portion of the reaction product to an amino group to produce p-acetylsulfanilylaminoguanidine, and removing the acetyl group by hydrolysis to produce sulfanilylaminoguanidine.

3. A compound represented by the following formula

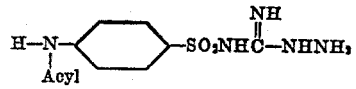

in which acyl is a carboxylic acid acyl radical.

4. A compound represented by the following formula

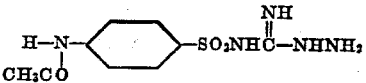

5. A compound represented by the following formula

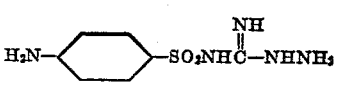

PHILIP S. WINNEK.

(References on following page)

REFERENCES CITED

The following references are of record in the file of this patent:

UNITED STATES PATENTS

| Number | Name | Date |
|---|---|---|
| 2,218,490 | Winnek | Oct. 15, 1940 |

OTHER REFERENCES

Marshall, "Bull. Johns Hopkins Hosp.," Sept. 1940, pages 164–165.

Roblin, "Jour. Am. Chem. Soc.," vol. 62, Aug. 1940, pages 2003–2005.